US011368346B1

(12) United States Patent
Krishnan et al.

(10) Patent No.: US 11,368,346 B1
(45) Date of Patent: Jun. 21, 2022

(54) SYSTEM FOR REDUCING CREST FACTOR AND PEAK TO AVERAGE POWER RATIO

(71) Applicant: AMAZON TECHNOLOGIES, INC., Seattle, WA (US)

(72) Inventors: Murali Krishnan, Bellevue, WA (US); Timothy Leo Gallagher, Woodinville, WA (US); Torbjorn Larsson, San Diego, CA (US)

(73) Assignee: AMAZON TECHNOLOGIE, INC., Seattle, WA (US)

( * ) Notice: Subject to any disclaimer, the term of this patent is extended or adjusted under 35 U.S.C. 154(b) by 8 days.

(21) Appl. No.: 16/928,368

(22) Filed: Jul. 14, 2020

(51) Int. Cl.
*H04L 27/26* (2006.01)
*H04B 7/185* (2006.01)

(52) U.S. Cl.
CPC ..... *H04L 27/2614* (2013.01); *H04B 7/18515* (2013.01)

(58) Field of Classification Search
None
See application file for complete search history.

(56) References Cited

U.S. PATENT DOCUMENTS

| | | | |
|---|---|---|---|
| 7,639,747 | B2 | 12/2009 | Moffatt et al. |
| 7,974,258 | B2 | 7/2011 | Holt |
| 8,442,137 | B2 | 5/2013 | Moffatt et al. |
| 9,313,078 | B1* | 4/2016 | Barman ............... H04L 27/2624 |
| 9,444,669 | B2 | 9/2016 | Brecher et al. |
| 2006/0104373 | A1* | 5/2006 | Bar-Ness ............. H04L 27/2617 375/260 |
| 2007/0121483 | A1 | 5/2007 | Zhang et al. |
| 2008/0187058 | A1* | 8/2008 | Sipila ................. H04L 27/2615 375/260 |
| 2018/0109408 | A1* | 4/2018 | Sandell ............... H04L 27/2615 |

OTHER PUBLICATIONS

"What is PAPR (Peak to average power ratio), Why it matters to Power Amplifier?", Techplayon, Jun. 8, 2017, 3 pgs. Retrieved from the Internet: URL: http://www.techplayon.com/papr-peak-average-power-ratio-matters-power-amplifier/.

(Continued)

*Primary Examiner* — Kodzovi Acolatse
(74) *Attorney, Agent, or Firm* — Lindauer Law, PLLC

(57) ABSTRACT

A constellation of many satellites and associated ground stations provide communication service to user terminals. These devices use modulation techniques such as orthogonal frequency division multiplexing (OFDM) to send large quantities of data. For transmission, a power amplifier increases the amplitude of a waveform modulated in this way. The power amplifier operates more efficiently closer to saturation. However, operation at saturation results in non-linear distortion, producing unwanted signals and increasing bit error rate. A set of techniques are used to reduce the peak to average power ratio (PAPR) of the waveform provided to the power amplifier. A distortionless technique remaps blocks of bits to reduce the resulting PAPR of that block. Additional techniques may also be progressively applied to reduce PAPR while minimizing adverse consequences such as in-band distortion, out of band emissions, increased bit error rate, and so forth. These techniques may include filtering, peak cancellation, and circular clipping.

20 Claims, 8 Drawing Sheets

(56) References Cited

OTHER PUBLICATIONS

"Crest Factor", Wikipedia Entry for definition of Crest factor, 7pgs Retrieved from the Internet on: Jun. 16, 2020 URL: https://en.wikipedia.org/wiki/Crest_factor.

"Understanding Waveform Clipping", Keysight, 4 pgs. Retrieved from the Internet on Jun. 16, 2020: URL: http://rfmw.em.keysight.com/wireless/helpfiles/n7601a-sw1/n7601a-sw1.htm#Understanding_Waveform_Clipping.htm.

Chauhan, et al., "A Nyquist Filter based Technique to Reduce PAPR in OFDM MIMO Communication System", IOSR Journal of Electronics and Communication Engineering, vol. 9, Issue 5, Ver. III (Sep.-Oct. 2014), pp. 12-19, 3 pgs. Retrieved from the Internet: URL: https://iosrjournals.org/iosr-jece/papers/Vol.%209%20Issue%205/Version-3/C09531219.pdf.

Ghassemi, et al., "Low-Complexity Distortionless Techniques for Peak Power Reduction in OFDM Communication Systems", Journal of Computer Networks and Communications, vol. 2012, Article ID 929763 & Department of Electrical and Computer Engineering, University of Victoria, Victoria, BC, Canada, Jun. 12, 2012, 14 pgs. Retrieved from the Internet: URL: https://www.researchgate.net/publication/258388932_Low-Complexity_Distortionless_Techniques_for_Peak_Power_Reduction_in_OFDM_Communication_Systems.

Kushnure, et al., "PAPR Reduction of OFDM System using LBC", MPGI National Multi Conference 2012, Proceedings published by International Journal of Computer Applications Department of Electronics & Telecommunication, SGGSIE&T, Nanded, Apr. 7-8, 2012, 5 pgs. Retrieved from the Internet: URL:https://research.jcaonline.org/ncaete/number2/mpginmc1086.pdf.

Mhatre, et al., "Efficient Selective Mapping PAPR Reduction Technique", International Conference on Advanced Computing Technologies and Applications 2015, 8 pgs. Retrieved from the Internet: URL: https://www.sciencedirect.com/science/article/pii/S1877050915003531.

Paredes, et al., "The Problem of Peak-to-Average Power Ratio in OFDM Systems", Department of Signal Theory and Communications, Universidad Carlos III de Madrid, Mar. 28, 2015, 8 pgs. Retrieved from the Internet: URL: https://arxiv.org/pdf/1503.08271.pdf.

Roy, et al., "High Power Amplifier Effects Analysis for OFDM System", International Journal of Scientific & Engineering Research, vol. 2, Issue 5, May 2013, 3 pgs. Retrieved from the Internet: http://ijsetr.org/wp-content/jploads/2013/07/IJSETR-VOLUME2-ISSUE-5-1119-1121.pdf.

* cited by examiner

US 11,368,346 B1

SYSTEM FOR REDUCING CREST FACTOR AND PEAK TO AVERAGE POWER RATIO

BACKGROUND

Wireless transmission of data provides many benefits. Satellites, such as those in non-geosynchronous orbits (NGO), may be used to transfer data between different locations.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
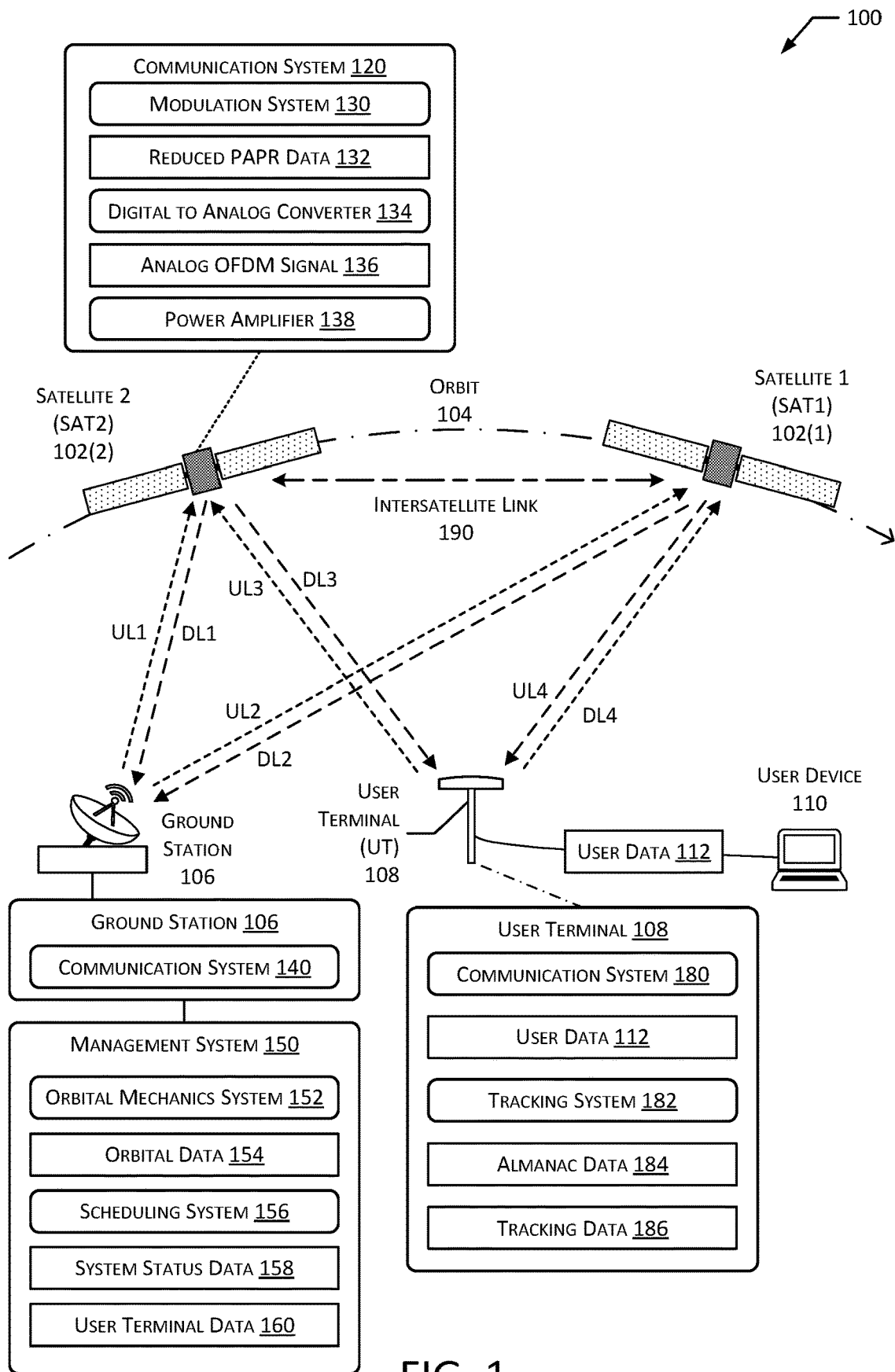
FIG. 1 illustrates a system using ground stations and a constellation of satellites to provide communication service using a modulation system that generates reduced peak-to-average power ratio (PAPR) data that is used to drive a power amplifier, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as radio frequency (RF) signals, to send information. Users or groups of users may be allocated portions of a spectrum of electromagnetic signals, or bands, to use for sending wireless signals. For example, a constellation of satellites and associated ground stations may be allocated a first band to communicate wirelessly. In another example, the constellation of satellites and user terminals (UTs) may be allocated a second band to communicate wirelessly.

Demand for ever increasing quantities of data continues to grow. To meet these demands, various modulation techniques are used to send data within a given range of frequencies. For example, Morse code could be sent wirelessly by turning a single carrier wave on and off. As the need to send more data within a given band of allocated spectrum increased, more sophisticated techniques for modulation came into use. One technique for modulating signals is orthogonal frequency division multiplexing (OFDM).

OFDM uses various techniques to send very large quantities of data very quickly. These techniques include simultaneously using many closely spaced subcarriers to send data. Data to be sent is divided up into pieces, with each piece sent using one of many subcarriers. Each subcarrier is modulated, or changed in some way, to represent the data to be sent. For example, the amplitude, phase, or other features of the subcarrier may be changed to encode the data.

The various subcarriers are combined and used to create a corresponding analog OFDM signal. Because the analog OFDM signal is made up of many individual subcarriers combined together, the resulting waveform is very complex. This is because the many subcarriers may constructively interfere with one another. This introduces a significant effect in the overall shape of the waveform.

A peak to average power ratio (PAPR) describes the relationship between the peak power in the waveform as compared to the average power. While the PAPR is a dimensionless number, the PAPR may be represented in units of decibels (dB). For example, a direct current signal (no change over time) has a PAPR of 0 dB and a single sine wave about 3 dB. Because of the constructive interference between subcarriers, in one implementation the PAPR for the analog OFDM signal may be about 12 dB. This means there may be a 12 dB difference between the average power and the peak power in that signal. Because the dB is a logarithmic scale, this means that the peak power can be about sixteen times the average power. A crest factor may also be calculated as the peak amplitude of the waveform divided by the root-mean-square (RMS) value of the waveform.

This analog OFDM signal may then be provided to the input of a power amplifier. The power amplifier boosts the amplitude of the analog OFDM signal at the input and produces an output signal. For example, the analog OFDM signal may be 0.1 watts, while the output signal may be 50 watts. That output signal may then be provided to an antenna for transmission.

To produce an accurate representation of the analog OFDM signal in the output signal, the power amplifier should be linear in the output produced relative to the input. For example, a power amplifier that is perfectly linear would produce as output a replica that is exactly the same as the input except for having a greater amplitude. As the non-linearity of the power amplifier (or associated circuitry) increases, the resulting output suffers from intermodulation distortion. This results in several adverse effects, including increased error rates, unwanted signals on undesired frequencies, and so forth.

The power amplifier also has a saturation point. At the saturation point, an increase in the amplitude of the input signal will not result in an increase in the output. If the power amplifier is operated at or beyond the saturation point, nonlinear distortions are introduced and the resulting output is distorted. To avoid introducing these nonlinear distortions, the power amplifier should not be provided with an input signal that results in saturation. However, this is problematic with the analog OFDM signal because of the substantial difference between the peak power and average power, as expressed by the PAPR of 12 dB. To avoid saturation, traditionally the power amplifier would need to be operated well below the saturation point, such that the peaks in the analog OFDM signal are below the saturation point.

To accommodate the relatively large PAPR of the analog OFDM signals and avoid saturation, power amplifiers are operated well below their maximum rated output. This provides "headroom" for those peaks in the analog OFDM signal to avoid saturation. However, this substantially reduces overall electrical efficiency of the power amplifiers.

Electrical efficiency is further impacted by the need for linear amplification. Power amplifiers consume electrical power during operation. Typically, the more electrically efficient a power amplifier is, the more non-linearity is introduced in the output. As a result, a linear power amplifier consumes more electrical power than a non-linear power amplifier.

Traditionally power amplifiers that amplify OFDM signals are oversized in that they operate well below saturation, even on the peaks. These power amplifiers are "backed off" or operated at less than their maximum gain to avoid introducing non-linear distortions. However, this reduction in electrical efficiency results in increased power consumption.

Traditional systems have attempted to address these issues by various crest factor reduction techniques such as peak clipping in which the portion of the waveform that exceeds a threshold value is removed. However, these techniques introduce additional problems. For example, clipping introduces a nonlinearity in the resulting signal, producing signals outside the desired band that may exceed desired thresholds. The more peaks in the analog OFDM signal are clipped, the worse the problem.

Users of available spectrum must avoid interfering with themselves or with other users. This includes interference within the allocated spectrum as well as interference outside of that allocated spectrum. Techniques that modify the analog OFDM need to do so in a way that does not impair the transmitted output signal, produce interfering signals, or cause other adverse effects. For example, clipping produces in-band distortion that can impair the transfer of data and also produces out of band spectral regrowth. In another example, operating the power amplifier beyond saturation produces out of band signals that may interfere with others.

Described in this disclosure are techniques for reducing the crest factor in an analog OFDM signal. By reducing the crest factor, and thus the PAPR, the power amplifier may be operated more closely to saturation. This results in improved electrical efficiency of the power amplifier. As a result, the system as described herein may be used in power constrained situations, such as onboard a satellite, a vehicle, and so forth. This is a substantial improvement compared to traditional technology.

The ability of OFDM to transfer large quantities of data is highly desirable in many applications, including satellite communications. However, the power amplifier limitations imposed by the PAPR on the size and electrical efficiency have traditionally precluded such use. By using the techniques described herein, OFDM may now be used in these situations.

The improved electrical efficiency also produces substantial benefits in other applications, such as for ground stations, by reducing the electrical energy dissipated as heat, and thus reducing cooling requirements.

The system utilizes a modular approach to crest factor reduction. A distortionless PAPR reduction module accepts input data and, in parallel, remaps portions of that data into different remapped bit sets or bit patterns. The remapped bit sets are tested to find the set with the lowest PAPR. That set is then used to generate the analog OFDM signal that is then used to drive the power amplifier. The remapping uses a known mapping, such as stored in lookup tables (LUTs), to generate the remapped bit sets. Also provided is data indicative of the LUT used to perform the remapping, facilitating reconstruction of the originally transmitted data at the receiving device. A relatively small number of maps may be tested. For example, 8192 bits may be tested using 16 LUTs. For example, a block with a length of 8192 bits may be processed to form 16 different blocks of remapped bit sets. Each of these 16 blocks are then processed to determine OFDM data. Those 16 blocks are compared to find the block with the lowest PAPR. The block with the lowest PAPR is then selected and subsequently used. The other blocks of remapped bit sets that were unused are discarded. The operation of the distortionless PAPR reduction module is compact and computationally efficient. As a result, it may be readily deployed using existing hardware, such as digital signal processors (DSPs) and field programmable gate arrays (FPGAs) or may be built into application specific integrated circuits (ASICs).

To reduce PAPR one or more filters may be applied during the determination of the OFDM data. For example, a filter may be applied prior to or during the discrete Fourier transform process to reduce the PAPR.

If the PAPR of the resulting data is greater than a threshold value, a peak cancellation process may be performed. For example, the filtered data may be processed to determine a peak where amplitude of the waveform exceeds a threshold value. A time-aligned bandlimited pulse with the opposite phase is added to the waveform, reducing the amplitude of the peak. Peak cancellation may introduce some in-band distortion, which may impair data transfer. By using the distortionless PAPR reduction first and peak cancellation next, the peak is reduced sufficiently that adverse effects of the peak cancellation are minimized.

If the PAPR of the data resulting from the peak cancellation is greater than the threshold value, a circular clipping process may be performed. Circular clipping reduces the amplitude of the peak without changing the phase of the signal. This is done by measuring the angle of the waveform as represented in the data, decreasing the amplitude represented in the data, and regenerating the representation of the waveform using the angle. Circular clipping creates out-of-band signals and also introduces in-band distortion that may impair data transfer. However, the previous processing using the distortionless PAPR reduction and the peak cancellation where necessary significantly reduces the likelihood of a peak that exceeds the threshold value (thus needing to be clipped) and also reduces the magnitude of the reduction in amplitude needed, minimizing the adverse effects of circular clipping.

The system produces as output reduced PAPR data. The reduced PAPR data may then be processed by a digital to analog converter (DAC) to produce an analog OFDM signal. This analog OFDM signal, now with substantially reduced PAPR, is provided as input to a power amplifier. The power amplifier, driven with the analog OFDM signal having the substantially reduced PAPR, may be operated much closer to saturation than previously available. As a result, electrical efficiency of the power amplifier is substantially improved. Compared to previously available techniques, the resulting analog OFDM signal and the amplified RF signal output from the power amplifier exhibit significantly reduced in-band distortion and out-of-band signals. This results in improved data transfer rates and reduces the possibility of interference with other systems.

The system may be used for a variety of applications including, but not limited to intersatellite communications, communications between satellite and ground station, communications between satellite and user terminals, between vehicles, between terrestrial stations, and so forth. For example, the system may be used in power constrained terrestrial applications, such as mountaintop installations using alternative power sources such as photovoltaics. In another example, the system may be used in portable devices, such as tablets, handheld devices, internet of things (IoT) devices, industrial control and monitoring, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period or time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth. For example, the orbit 104 is a low earth orbit (LEO). In this illustration, the orbit 104 is depicted with an arc pointed to the right. A first satellite (SAT1) 102(1) is leading (ahead of) a second satellite (SAT2) 102(2) in the orbit 104.

The satellite 102 includes a communication system 120 that is used to provide communications between the satellite 102 and other devices, such as the ground station 106, user terminal 108, other satellites 102, and so forth. The communication system 120 includes a modulation system 130 that uses modulation techniques such as orthogonal frequency division multiplexing (OFDM) to encode data for transmission.

OFDM uses various techniques to send very large quantities of data very quickly. These techniques include simultaneously using many closely spaced subcarriers to send data. Data to be sent is divided up into pieces, with each piece sent using one of the many subcarriers. Each subcarrier is modulated, or changed in some way, to represent the data to be sent. For example, amplitude, phase, or other features of the subcarrier may be changed to encode the data.

The various subcarriers are combined and used to create a corresponding analog OFDM signal. Because the analog OFDM signal is made up of many individual subcarriers combined together, the resulting waveform is very complex. This is because the many subcarriers may constructively interfere with one another. This introduces a significant effect in the overall shape of the waveform.

A peak to average power ratio (PAPR) describes the relationship between the peak power in the waveform as compared to the average power. While the PAPR is a dimensionless number, the PAPR may be represented in units of decibels (dB). For example, a direct current signal (no change over time) has a PAPR of 0 dB and a single sine wave about 3 dB. Because of the constructive interference between subcarriers, in one implementation the PAPR for the analog OFDM signal may be about 12 dB. This means there may be a 12 dB difference between the average power and the peak power in that signal. Because the dB is a logarithmic scale, this means that the peak power can be about sixteen times the average power. A crest factor may also be calculated as the peak amplitude of the waveform divided by the root-mean-square (RMS) value of the waveform.

The modulation system 130 may operate in the digital domain, processing the input data and generating reduced PAPR data 132 that is representative of the analog OFDM signal 136 that will ultimately be generated using a digital to analog converter (DAC) 134. The reduced PAPR data 132 will be discussed in more detail below.

Once generated, the analog OFDM 136 signal may then be provided to the input of a power amplifier 138. The power amplifier 138 boosts the amplitude of the analog OFDM signal 136 received at the input and produces an output signal. For example, the analog OFDM signal may be 0.1 watts, while the output signal may be 50 watts. That output signal may then be provided to an antenna for transmission.

To produce an accurate representation of the analog OFDM signal 136 in the output signal, the power amplifier should be linear in the output produced relative to the input. For example, a power amplifier 138 that is perfectly linear would produce as output a replica that is exactly the same as the input except for having a greater amplitude. As the non-linearity of the power amplifier (or associated circuitry) increases, the resulting output suffers from intermodulation distortion. This results in several adverse effects, including increased error rates, unwanted signals on undesired frequencies, and so forth.

The power amplifier 138 also has a saturation point. At the saturation point, an increase in the amplitude of the input signal will not result in an increase in the output. If the power amplifier 138 is operated at or beyond the saturation point, nonlinear distortions are introduced and the resulting output is distorted. To avoid introducing these nonlinear distortions, the power amplifier 138 should not be provided with an input signal that results in saturation. However, this is problematic with the analog OFDM signal 136 because of the substantial difference between the peak power and average power, as expressed by the PAPR of 12 dB. To avoid saturation, traditionally the power amplifier 138 would need to be operated well below the saturation point, such that the peaks in the analog OFDM signal 136 are below the saturation point.

To accommodate the relatively large PAPR of the analog OFDM signals 136 and avoid saturation, traditionally the power amplifier 138 is operated well below a maximum rated output. This provides "headroom" for those peaks in the analog OFDM signal 136 to avoid saturation. However, this substantially reduces overall electrical efficiency of the power amplifier 138.

Electrical efficiency is further impacted by the need for linear amplification. Power amplifiers 138 consume electrical power during operation. Typically, the more electrically efficient a power amplifier 138 is, the more non-linearity is introduced in the output. As a result, a linear power amplifier 138 consumes more electrical power than a non-linear power amplifier.

As described in this disclosure, the modulation system 130 processes input data and generates reduced PAPR data 132. This reduced PAPR data 132 may then be processed by the DAC 134 to produce an analog OFDM signal 136 that exhibits reduced PAPR, allowing the power amplifier 138 to be operated closer to saturation without introducing undesirable in-band or out-of-band interference. For example, the analog OFDM signal 136 provided to the power amplifier 138 may have a peak amplitude that allows the power amplifier 138 to operate at between 60% and 95% of saturation.

The modulation system 130 may use one or more different crest reduction techniques alone or in combination to generate the reduced PAPR data 132. The modulation system 130 may include a distortionless PAPR reduction module that accepts the input data and, in parallel, remaps portions of that data into different remapped bit sets using predefined lookup tables. Each of the predefined lookup tables results in different output given the same input, and so the PAPRs produced by those different outputs will vary. The remapped bit sets are then tested to select the remapped bit set with the lowest PAPR. The selected remapped bit set is then used to generate the reduced PAPR data 132. The operation of the distortionless PAPR reduction module is compact and computationally efficient. As a result, it may be readily deployed using existing hardware, such as digital signal processors (DSPs) and field programmable gate arrays (FPGAs) or may be built into application specific integrated circuits (ASICs).

To reduce PAPR one or more filters may be applied during the determination of the OFDM data. For example, a filter may be applied prior to or during the discrete Fourier transform process to reduce the PAPR.

If the PAPR of the resulting data is greater than a threshold value, a peak cancellation process may be performed. For example, the filtered data may be processed to determine a peak where the waveform exceeds a threshold value. A time-aligned bandlimited pulse with the opposed phase is added to the waveform, reducing the amplitude of the peak. Peak cancellation may introduce some in-band distortion, which may impair data transfer. By using the distortionless PAPR reduction first and peak cancellation next, the peak is reduced sufficiently that adverse effects of the peak cancellation are minimized.

If the PAPR of the data resulting from the peak cancellation is greater than the threshold value, a circular clipping process may be performed. Circular clipping reduces the amplitude of the peak without changing the phase of the signal. This is done by measuring the angle of the waveform as represented in the data, decreasing the amplitude represented in the data, and regenerating the representation of the waveform using the angle. Circular clipping creates out-of-band signals and also introduces in-band distortion that may impair data transfer. However, the previous processing using the distortionless PAPR reduction and the peak cancellation where necessary significantly reduces the likelihood of a peak that exceeds the threshold value (thus needing to be clipped) and also reduces the magnitude of the reduction in amplitude needed, minimizing the adverse effects of circular clipping.

The reduced PAPR data 132 produced by the modulation system 130 may then be processed by a digital to analog converter (DAC) 134 to produce the analog OFDM signal 136. This analog OFDM signal 136, now with substantially reduced PAPR compared to a signal produced by the non-processed input data, is provided as input to a power amplifier 138. The power amplifier 138, driven with the analog OFDM signal 136 having the substantially reduced PAPR, may be operated much closer to saturation than previously available.

Figure 2:
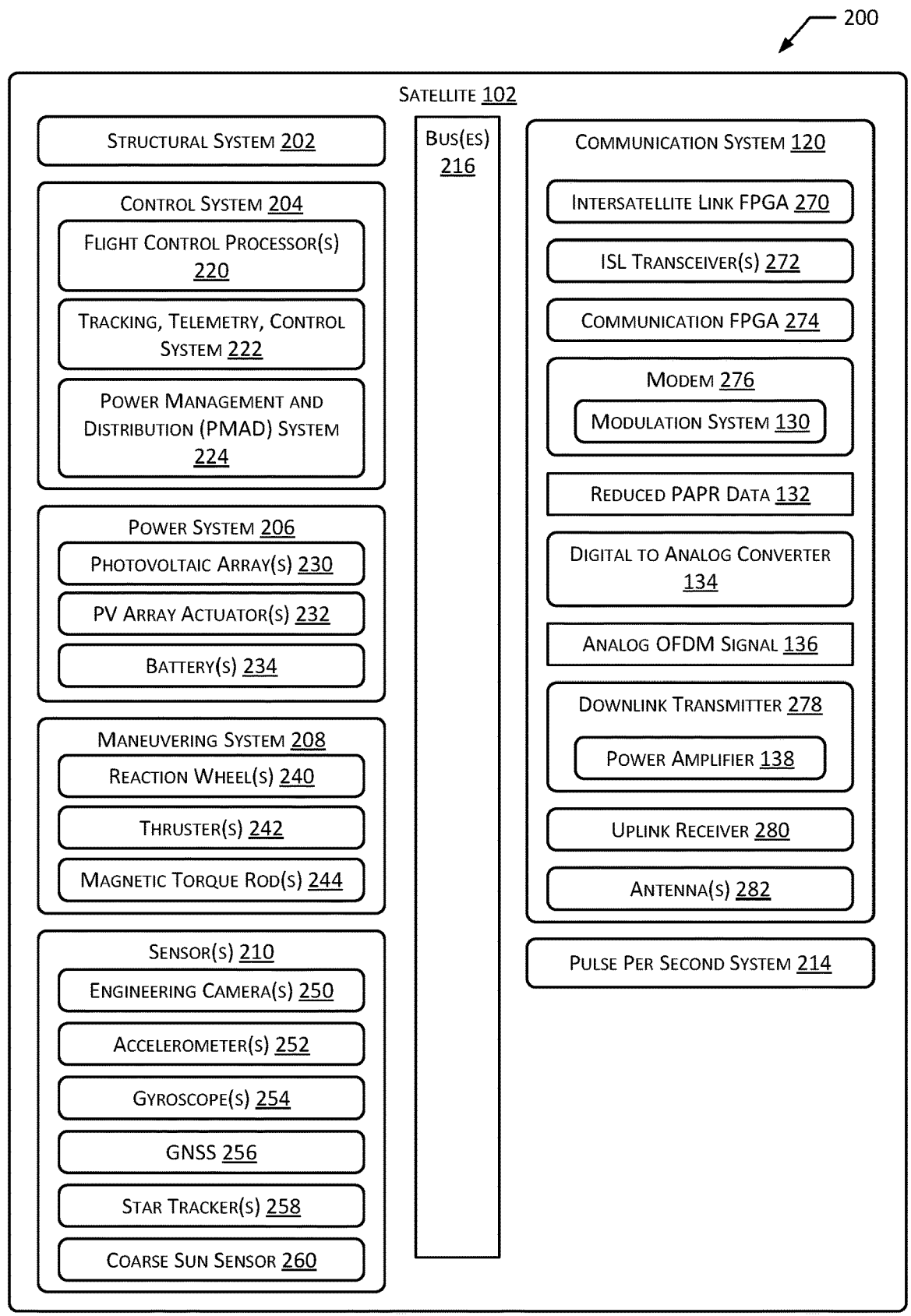
FIG. 2 is a block diagram of a satellite, according to some implementations.

The satellite 102 is discussed in more detail with regard to FIG. 2. The distortionless PAPR reduction module and other crest reduction techniques are discussed with regard to FIGS. 3-7.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data 112 or other data between the one or more communication networks and the satellites 102. Such data may be processed by the ground station 106 and communicated via the communication system 140. The communication system 140 of a ground station may include components similar to those of the communication system 120 of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth. The communication system 140 may include the modulation system 130 to generate the reduced PAPR data 132 for transmission of data from the ground station 106 to the satellite 102.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data 112. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data 112 associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of the communication system 120 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The communication system 180 may include the modulation system 130 to generate the reduced PAPR data 132 for transmission of data from the UT 108 to the satellite 102.

The UT 108 passes user data 112 between the constellation of satellites 102 and the user device 110. The user data 112 includes data originated by the user device 110 or addressed to the user device 110. The UT 108 may be fixed or in motion. For example, the UT 108 may be used at a residence, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information at a specified time. The determination of the tracking data 186 may be ongoing. For example, the UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link 190 provides for communication between satellites 102 in the constellation.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

FIG. 2 is a block diagram of some systems associated with the satellite 102, according to some implementations. The satellite 102 may comprise a structural system 202, a control system 204, a power system 206, a maneuvering system 208, one or more sensors 210, and a communication system 120. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 120. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 120 provides communication with one or more other devices, such as other satellites 102, ground stations 106, user terminals 108, and so forth. The communication system 120 may include one or more modems, digital signal processors, power amplifiers 138, antennas (including at least one antenna that implements multiple antenna elements, such as a phased array antenna), processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 120 may be output to other systems, such as to the control system 204, for further processing. Output from a system, such as the control system 204, may be provided to the communication system 120 for transmission.

The communication system 120 may include hardware to support the intersatellite link 190. For example, an intersatellite link FPGA 270 may be used to modulate data that is sent and received by an ISL transceiver 272 to send data between satellites 102 and provide the intersatellite link 190. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to generate the reduced PAPR data 132 that is processed by the DAC 134 to produce the analog OFDM signal 136 that is then amplified by the power amplifier 138 of a downlink transmitter 278. The modem 276 may also demodulate signals received using an uplink receiver 280. The modem 276 may include the modulation system 130 described herein. The satellite 102 may include one or more antennas 282 connected to the downlink transmitter 278, uplink receiver 280, or other devices. For example, one or more parabolic antennas may be used to provide communication between the satellite 102 and one or more ground stations 106. In another example, a phased array antenna may be used to provide communication between the satellite 102 and the UTs 108.

Figure 3:
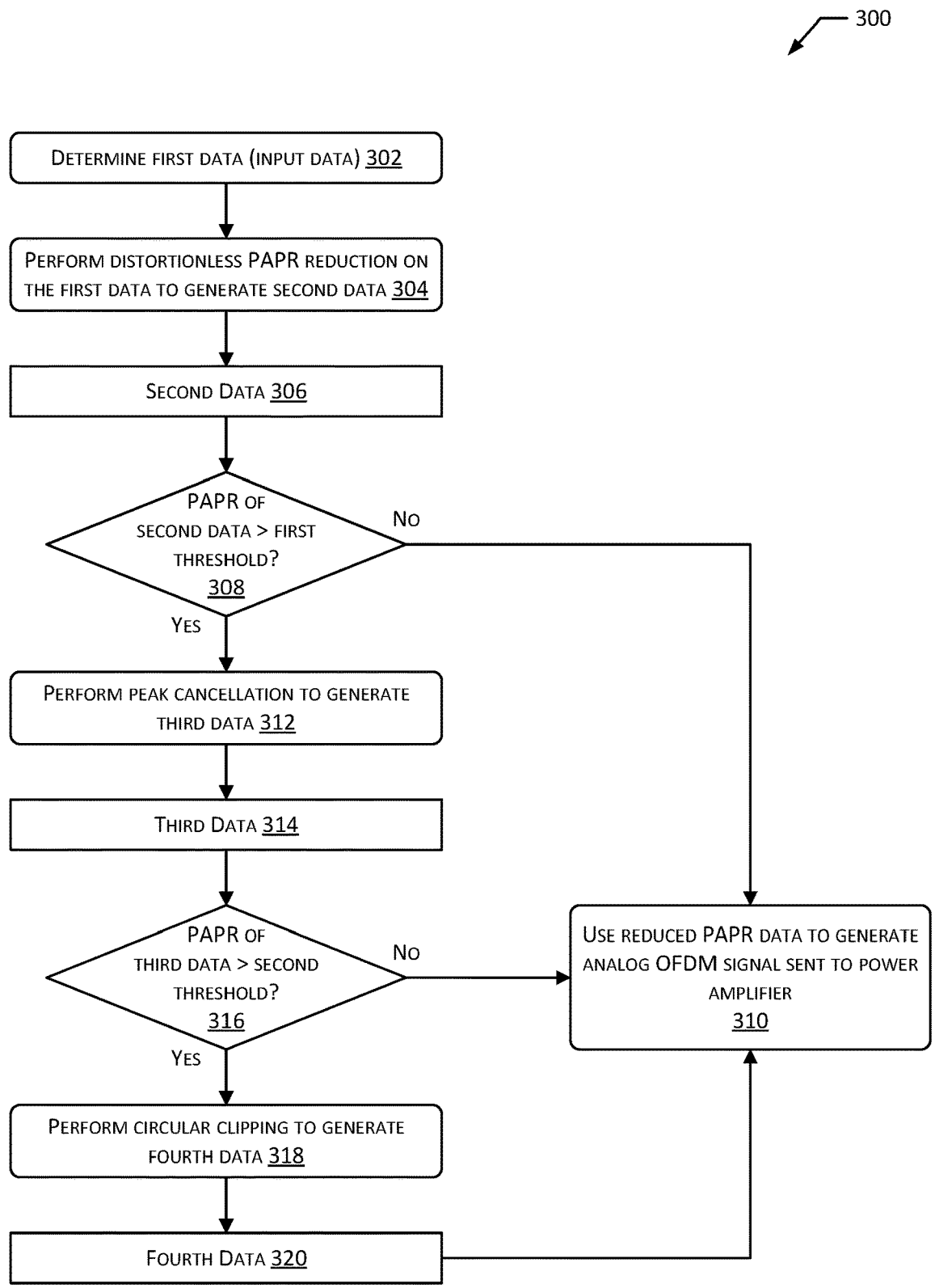
FIG. 3 is a flow diagram of a process of generating reduced PAPR data to generate an analog signal sent to a power amplifier for transmission, according to some implementations.

FIG. 3 is a flow diagram 300 of a process of generating reduced PAPR data 132 to generate an analog signal sent to a power amplifier 138 for transmission, according to some implementations. The process may be implemented at least in part by one or more of the ground station 106, the satellite 102, the UT 108, and so forth. The process may be performed by a processor, DSP, FPGA, ASIC, discrete circuitry, and so forth.

At 302 first data is determined for transmission. For example, the first data may comprise input data that has been designated for transmission from the ground station 106 to the satellite 102. In another example, the first data may comprise user data 112 that is to be sent from the UT 108 to the satellite 102.

At 304 a distortionless PAPR reduction is performed on the first data to generate second data 306. The distortionless PAPR reduction is discussed in more detail with regard to FIGS. 4-6.

At 308 a PAPR of the second data 306 is determined and compared to a first threshold. For example, the PAPR may be determined by processing the second data 306 with a Fourier transform function to generate first output. The first output comprises data that is a digital representation of an analog waveform, including information indicative of amplitude. The amplitude for at least a portion of the first output may be processed to calculate the PAPR, crest factor, or other metric. The first threshold may be determined based on characteristics of the power amplifier 138. For example, the first threshold may be a PAPR value of less than 6.4 dB.

At 308, if the PAPR of the second data 306 is less than or equal to the first threshold, the process may proceed to 310. In this situation, the second data 306 is the reduced PAPR data 132. At 310 the reduced PAPR data 132 is used by the DAC 134 to generate the analog OFDM signal 136. The analog OFDM signal 136 is then sent to the power amplifier 138. If at 308 the PAPR of the second data 306 is greater than the first threshold, the process proceeds to 312.

At 312 the second data 306 is processed using a peak cancellation algorithm to generate third data 314. The peak cancellation may comprise processing the second data 306 that is representative of a first waveform to determine one or more portions of the third data 314 that have an amplitude value exceeding a threshold value. A time-aligned bandlimited pulse with opposite phase is added to the second data 306 to reduce the amplitude of at least a portion of the first waveform. The pulse shape is determined such that resulting distortion is confined to the bandwidth of the first waveform. Peak cancellation does introduce some in-band distortion. As a result, an error vector magnitude (EVM) of the resulting third data 314 may be increased.

At 316 a PAPR of the third data 314 is determined and compared to a second threshold. In some implementations the second threshold may have the same value as the first threshold. If the PAPR of the third data 314 is less than or equal to the second threshold, the process may proceed to 310. In this situation, the third data 314 is the reduced PAPR data 132. If the PAPR of the third data 314 is greater than the second threshold, the process proceeds to 318.

At 318 the third data 314 is processed using a circular clipping algorithm to generate fourth data 320. The fourth data 320 is representative of a second waveform. The circular clipping algorithm determines one or more portions of the third data 314 that have an amplitude value exceeding a threshold value. The circular clipping algorithm preserves the phase of the second waveform while reducing the amplitude. However, the hard limits imposed by circular clipping result in adverse effects, including out-of-band spectral regrowth and introduction of in-band distortion that effects the EVM of the resulting signal. As a result, it is advantageous to minimize the use of circular clipping. By using the techniques described above, the PAPR of the third data 314 is substantially reduced compared to the first data, resulting in a substantial reduction in the incidence of circular clipping in the fourth data 320. The fourth data 320 is then used as the reduced PAPR data 132 and the process proceeds to 310.

In some implementations one or more of the operations described may be performed in a different order. For example, the circular clipping described at 318 may be performed before the peak cancellation described at 312.

Figure 4:
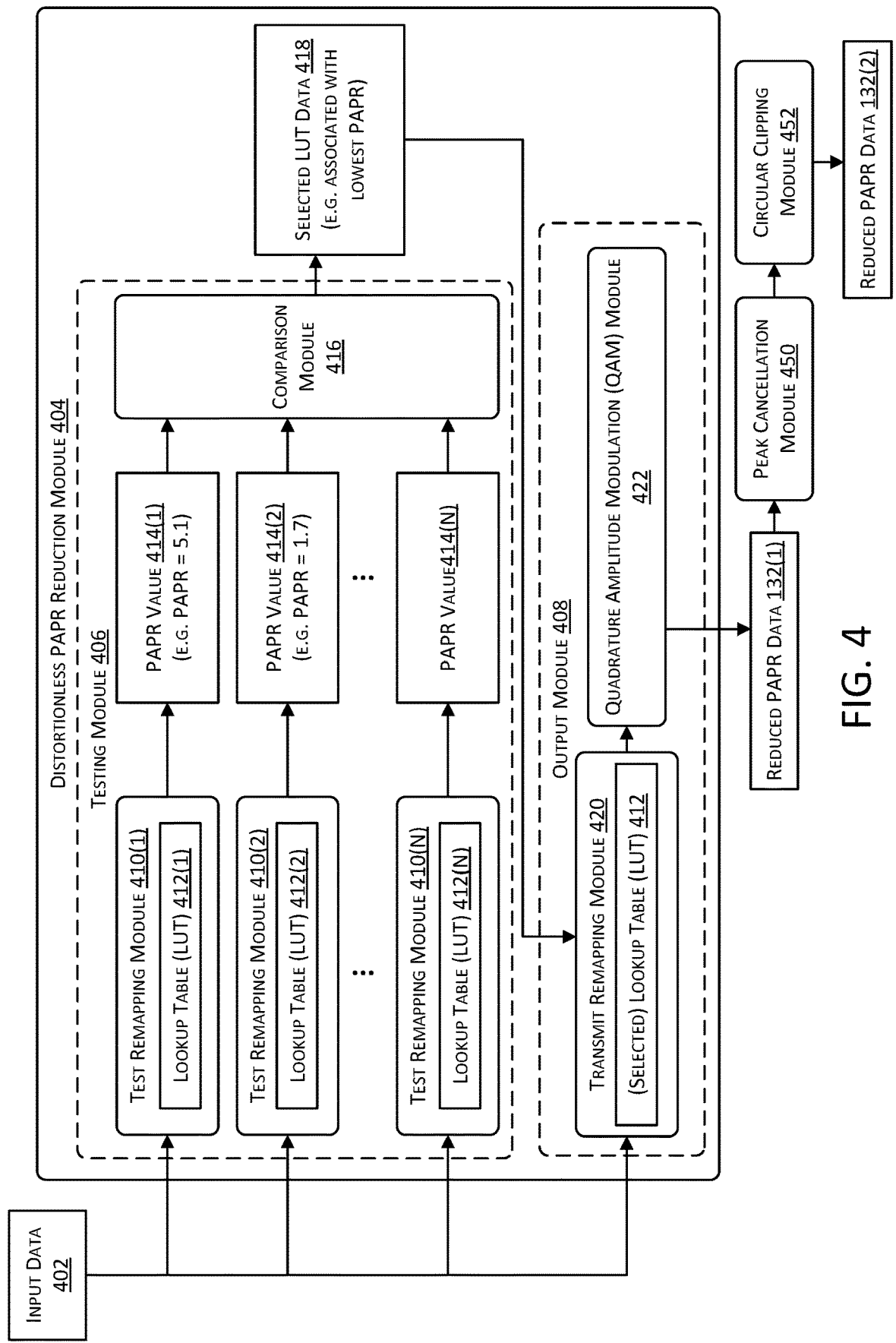
FIG. 4 is a block diagram of a portion of the modulation system 130 including a distortionless PAPR reduction module, according to some implementations.

FIG. 4 is a block diagram 400 of a portion of the modulation system 130 including a distortionless PAPR reduction module, according to some implementations. Input data 402 is provided as input to the distortionless PAPR reduction module 404.

The distortionless PAPR reduction module 404 includes a testing module 406 and an output module 408. The testing module 406 comprises a plurality of test remapping modules 410(1), 410(2), . . . , 410(N). Each of the test remapping modules 410 accepts the input data 402 and applies different bit remapping patterns. These different patterns of input bits, once modulated, will result in different analog waveforms. By applying different bit remapping patterns, such as represented in a lookup table (LUT) 412, the input data 402 is changed into a remapped bit set.

The resulting remapped bit set is then processed to generate test output. For example, the remapped bit set is modulated using quadrature amplitude modulation to generate symbol output. The test output may comprise a representation of a waveform that is produced by processing the symbols with a first Fourier transform using a low bit width. For example, the low bit width may be 5 bits, indicating that 5 bits of data are used to represent the waveform. The test output is then processed to determine a PAPR value 414 that is indicative of the PAPR of the test output. Because the test output was determined based on the remapped bit set 520, and the remapped bit set 520 is determined based on the LUT 412 that was used, the resulting PAPR value 414 is associated with the LUT 412 used. Each of the test remapping modules 410(1)-(N) generates as output respective PAPR values 414(1)-(N) that are provided to a comparison module 416. While the input data 402 was the same, the bit remapping results in representations of different analog waveforms. These different analog waveforms will exhibit different PAPRs from one another. The operation of the test remapping module 410 is discussed in more detail with regard to FIG. 5A.

The number of test remapping modules 410 used may be determined based on a variety of factors. For example, test remapping modules 410(1)-(16) may be used to process the input data 402. The test remapping modules 410 may operate in parallel, series, or a combination thereof. For example, sixteen separate test remapping modules 410 may operate in parallel, or a single test remapping module 410 may operate sixteen times.

The comparison module 416 determines the lowest PAPR value 414 from the set of PAPR values 414(1)-(N). In the event several PAPR values 414 tie for lowest, one or more tiebreaker rules may be used. For example, a first value stored in memory may be selected from a set of identical values.

The comparison module 416 provides selected LUT data 418 that is indicative of a particular LUT 412 that is associated with the lowest PAPR value 414. For example, the test remapping module 410(1) uses LUT 412(1) and produces first test output with a PAPR value 414 of 5.1. Continuing the example, the test remapping module 410(2) uses LUT 412(2) and produces second test output with a PAPR value 414 of 1.7. The remaining test remapping modules 410(3)-(N) produce PAPR values 414 that are greater. As a result, the comparison module 416 determines that the PAPR value 414(2) of 1.7 is the lowest. The selected LUT data 418 would then be determined that is indicative of the LUT 412(2) used by the test remapping module 410(2).

The output module 408 may accept as input the input data 402 and the selected LUT data 418. A transmit remapping module 420 uses the selected LUT data 418 to remap the input data 402 using the LUT 412 that produced the lowest PAPR during testing. The output remapped bit set produced by the transmit remapping module 420 is provided to a modulation module, such as a quadrature amplitude modulation (QAM) module 422. The QAM module 422 may include a Fourier transform module to implement a fast Fourier transform (FFT) or inverse fast Fourier transform (IFFT). The QAM module 422 may operate the Fourier transform module using a bit width that is greater than that used by the test remapping modules 410. For example, the QAM module 422 may operate the Fourier transform module with a bit width of 12 bits. The QAM module 422 processes the remapped bit set and generates reduced PAPR data 132(1).

In another implementation, the transmit remapping module 420 may be omitted. In this implementation, the remapped bit set determined by the testing module 406 that is associated with the selected LUT data 418 may be provided as input to the QAM module 422.

In some implementations the reduced PAPR data 132(1) may be further processed. A peak cancellation module 450 may apply a time-aligned bandlimited pulse with opposite phase to cancel out a portion of the waveform represented by the reduced PAPR data 132(1) that exceeds a threshold value. For example, the peak cancellation module 450 determines one or more peaks, or portions of the waveform that exceeds a maximum amplitude. One or more correction pulses, each having an opposite phase as compared to the peak are generated. The correction pulses are summed to produce a correction signal. The correction signal is then summed to the waveform represented by the reduced PAPR data 132(1). The peak cancellation module 450 may be implemented as one or more of executable code, hardware, or a combination thereof. In some implementations, output from the peak cancellation module 450 may be provided to a circular clipping module 452.

The circular clipping module 452 reduces the amplitude of a waveform peak without changing a phase of the signal. The representation of the signal that is received by the circular clipping module 452, such as reduced PAPR data 132, is processed to determine a sample comprising a peak that exceeds a threshold value. The phase angle of the peak in the sample is measured and stored. The amplitude of the signal in the sample is decreased. For example, an attenuator is used to reduce the amplitude of the peak in the sample. The sample is then processed to regenerate the representation of the waveform. The regeneration uses the previously stored measured phase angle. By using circular clipping, the clipping always occurs along a radii of the detected samples on the IQ plane, preserving the phase of every sample.

The processing of the reduced PAPR data 132(1) by one or more of the peak cancellation module 450 or the circular clipping module 452 results in reduced PAPR data 132(2). As a result of this additional processing, the PAPR of the reduced PAPR data 132(2) may be lower than the reduced PAPR data 132(1). The reduced PAPR data 132(2) may be provided as input to the DAC 134 and used to generate the analog OFDM signal 136. This analog OFDM signal 136 exhibits a significantly lower PAPR than would otherwise result from the input data 402. This lower PAPR improves the electrical efficiency and operational efficiency of the power amplifier 138.

Figure 5A:
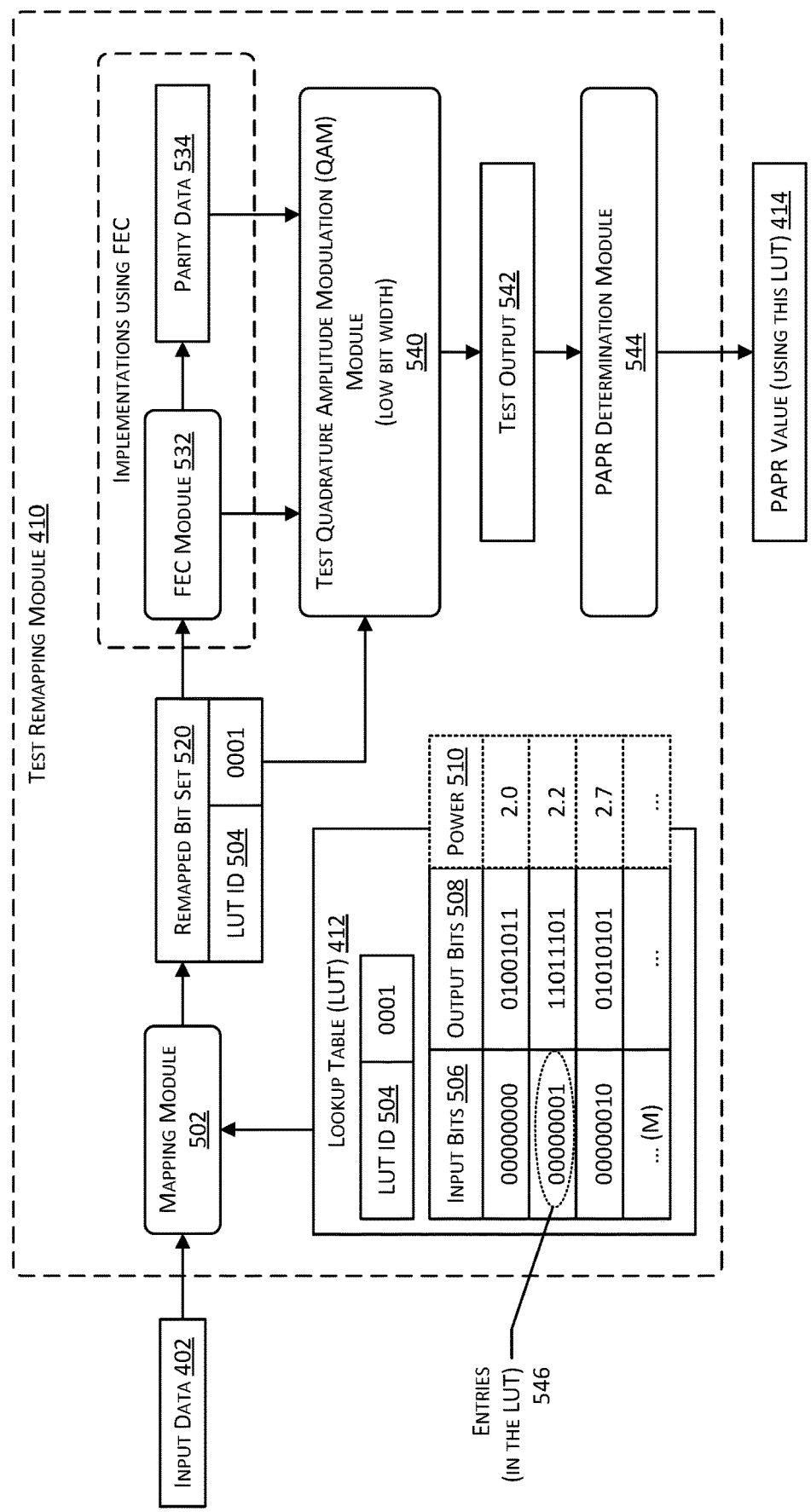
FIG. 5A is a block diagram of a test remapping module used by the distortionless PAPR reduction module, according to some implementations.

FIG. 5A is a block diagram 500 of a test remapping module 410 used by the distortionless PAPR reduction module 404, according to some implementations. In some implementations, the input data 402 may be divided into two bitstreams: "in-phase bits" or "I bits" and "quadrature phase bits" or "Q bits". Data may be transmitted by performing phase angle modulation on two amplitude modulated sinusoidal signals having the same frequency that are offset in phase by one-quarter cycle. At transmit, these two signals are combined. For example, the I bits may be encoded using an in-phase waveform while the Q bits are encoded on a quadrature phase waveform that is offset by one-quarter cycle, relative to the in-phase waveform. The test remapping module 410 may process the two bitstreams as described herein.

The input data 402 is provided as input to a mapping module 502. The mapping module 502 may use a lookup table ("LUT") 412 during operation that comprises a plurality of entries 546. The LUT 412 may comprise a lookup table identifier ("LUT ID") 504 that indicates that particular LUT 412. The entries 546 of the LUT 412 comprise a set of input bits 506 and associated output bits 508. The association between entries of input bits 506 and entries of output bits 508 is a one-to-one relationship. Each individual entry of input bits 506 maps to an individual entry of output bits 508. In this illustration, each entry 546 in the input bits 506 and the output bits 508 has a bit width of 8 bits.

While LUTs 412 are described, in other implementations other data structures may be used. For example, a list may be used in which the input bits 506 are omitted as assumed, and only output bits 508 are specified.

A depth of the LUT 412, which may be visualized as rows in a table, corresponds to the modulation order "M" of the modulation being used. The modulation order "M" is determined by the number of different symbols that are available to encode data.

The width, or number of bits of an entry 546 in the LUT 412 is calculated as log 2(M). For example, if 256 QAM is being implemented by the QAM module 422, the width of each entry is 8 bits, representing the 256 possible symbols that can be generated. As the modulation order "M" equals 256, the depth of the LUT 412 is 256 rows.

Continuing the example, the width of the bit entries is log(2)(256), or 8 bits. Of the 256 possible QAM symbols, each represented by a complex number in the I-Q plane, each can represent 8 bits of data. Each symbol encodes 8 bits. If represented in binary, that would result in possible encoded values of 00000000 to 11111111, or 256 possible permutations.

Within the LUT 412, the input bits 506 are associated with corresponding output bits 508. Each lookup table 412 may have the same set of input bits 506, that of all possible permutations given the modulation order being used, but has different output bits 508 associated with at least some of the permutations of input bits 506.

Each of the LUTs 412(1)-(N) in the testing module 406 provides a different mapping or association between input bits 506 and output bits 508. In some implementations, different LUTs 412 may be generated by calculating the power 510 associated with a symbol that corresponds to a particular set of output bits 508. The power 510 may be calculated using the complex number describing a location in the I-Q plane of the symbol that is associated with the output bits 508.

$$\text{Power} = I^2 + Q^2 \qquad \text{(Equation 1)}$$

For example, if the output bits 508 "01001011" correspond to the complex number 1+1i, the power 510 associated with this arrangement of output bits 508 would be 2.

In this figure, the power 510 associated with the output bits 508 is depicted for ease of illustration and not necessarily as a limitation. For example, a LUT 412 may only comprise the input bits 506 and the output bits 508, omitting the data indicative of the power 510.

To determine the particular correspondence of input bits 506 to output bits 508, a list of the output bits 508 and corresponding power 510 may then be sorted based on the power 510. For example, a first LUT 412(1) may use an ascending sort based on the power 510, placing those output bits 508 corresponding to a lowest power at the top of the list represented by the LUT 412 and those output bits 508 with highest power at the bottom of the LUT 412. A second LUT 412(2) may use a descending sort, with highest power at the top of the list. A third LUT 412(3) may use a shuffle sort, in which lowest power and lowest values are interleaved with one another. A fourth LUT 412(4) may use a random or pseudorandom function to associate input bits 506 with output bits 508.

During operation, the LUTs 412(1)-(N) and their specific correspondence between particular input bits 506 and output bits 508 may remain fixed over time. In other implementations, the LUTs 412 could be determined dynamically. For example, a seed value may be provided that is used to determine a reproducible mapping of input bits 506 to output bits 508.

The mapping module 502 processes the input data 402 using the LUT 412 to transform the input data 402 into a remapped bit set 520. The associated LUT ID 504 may also be provided in conjunction with the remapped bit set 520, or may be embedded within the remapped bit set 520. For example, if the first 8 bits of the input data 402 are "0000001", the corresponding first 8 bits of the remapped bit set 520 would be "11011101".

The remapped bit set 520 may be provided to a test modulation module, such as a test QAM module 540. The test QAM module 540 processes the remapped bit set 520 and determines test output 542. The test output 542 is then processed by a PAPR determination module 544 to determine a PAPR value 414.

The test QAM module 540 performs the modulation to be used by the system, but may operate at a lower bit width than the QAM module 422 used by the output module 408. For example, the QAM module 422 may use a high bit width of 12 bits while performing FFT operations. In comparison, the test QAM module 540 may use a low bit width of 5 bits. As a result, the test output 542 provided by the test QAM module 540 may be inadequate for communication purposes, but is sufficient for determining a PAPR value 414 of the resulting waveform. By using the test QAM module 540 with a low bit width that is less than the high bit width of the QAM module 422, the overall complexity of the system is reduced. Power consumption and computational requirements are also reduced.

In implementations where forward error correction (FEC) is to be used during transmission, the test remapping module 410 may include one or more FEC modules 532 that implement a forward error correction scheme. For example, the FEC module 532 may implement a low-density parity-check (LDPC) code and generate output including parity data 534. The test QAM module 540 may process the output from the FEC module 532 and the parity data 534 to determine the test output 542. Implementations of the test remapping module 410 using the FEC module(s) 532 may result in further reductions of the PAPR compared to implementations that do not implement the FEC module(s) 532. For example, the use of FEC may introduce into the stream of bits that are subsequently modulated parity bits, padding bits, repeated bits, and so forth. As a result, FEC may result in the bits of the input data 402 being spread, distributed, repeated, and so forth, over time, altering the output generated during modulation. For example, a systematic FEC scheme introduces additional bits into the data being modulated, that may distribute the corresponding symbols that result from modulation to be transmitted over a larger span of time, decreasing the PAPR.

In some implementations, the FEC module(s) 532 may be omitted to reduce complexity of the test remapping module 410, increase throughput, and so forth.

The test QAM module 540 may include one or more modules, such as an amplitude mapper module, a sign mapper module, a Fourier transform module, and so forth to produce quadrature amplitude modulation (QAM) test output 542. The amplitude mapper module may accept as input the remapped bit set 520 and associates a particular amplitude value with one or more bits. Output from the amplitude mapper module may be provided to the sign mapper module. The sign mapper module associates a phase sign to one or more bits that is received as input. In some implementations the sign mapper module may also accept as input one or more unshaped bits. The unshaped bits may comprise a portion of the input data 402 that is not processed by the mapping module 502. The use of the unshaped bits may be determined based on a desired forward error correction (FEC) coding rate, fast Fourier transform (FFT) size, modulation order, and so forth. In some implementations, no unshaped bits are used, and all bits in the input data 402 are processed by the mapping module 502.

Output from the sign mapper module is provided to a Fourier transform module. The Fourier transform module may implement a discrete Fourier transform (DFT) algorithm, a discrete Fouriertransform spread (DFTS), a fast Fouriertransform approximation algorithm, and so forth. In some implementations inverse fast Fourier transforms (IFFT) may be used.

Different Fourier transform algorithms, or algorithms with different parameters such as bit width, may be used at different times or by different modules in the system. In one implementation, the Fourier transform module may utilize a less precise but more computationally efficient fast Fourier transform (FFT) while determining the selected LUT 412 that produces the lowest PAPR value 414. In another implementation, a lower bit width may be used by the Fourier transform module while determining the PAPR value 414.

Figure 5B:
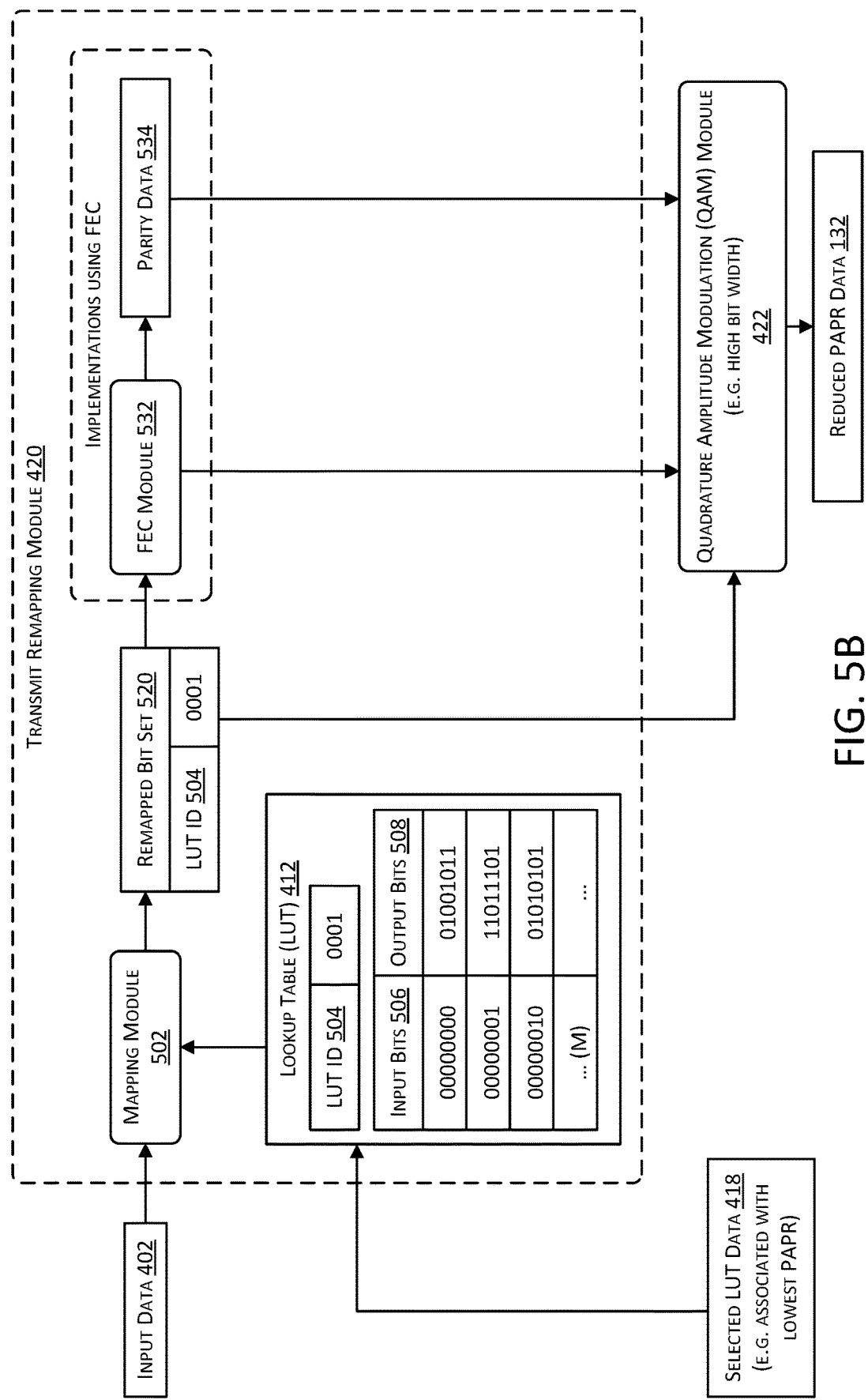
FIG. 5B is a block diagram of a transmit remapping module used by the distortionless PAPR reduction module, according to some implementations.

FIG. 5B is a block diagram of a transmit remapping module 420 used by the distortionless PAPR reduction module 404, according to some implementations. Similar to the test remapping module 410, the transmit remapping module 420 processes input data 402 with a mapping module 502 using a LUT 412. The LUT 412 used by the mapping module 502 is that specified in the selected LUT data 418. For example, the LUT 412 used by the mapping module 502 in the transmit remapping module 420 was the LUT 412 that resulted in the lowest PAPR value 414 during testing.

The mapping module 502 produces a final remapped bit set 520. The final remapped bit set 520 includes, or is associated with, data that is indicative of the LUT 412 that was used. For example, the LUT ID 504 may be associated with the remapped bit set 520. During demodulation at a receiving device, the LUT ID 504 is used by a receiving mapping module to retrieve a version of the same LUT 412 in which the output bits 508 and the input bits 506 are swapped. The receiving mapping module processes the received bit set and uses the corresponding LUT 412 to reconstruct the original input data 402. In some implementations, the transmit remapping module 420 may operate on blocks of input data 402. The size of each block may be based on the size of the fast Fourier transform in use.

In implementations where FEC is to be used, the final remapped bit set 520 may be used as input to a FEC module 532. As described above, use of FEC may result in additional decreases in the PAPR in the output. For example, the introduction of parity bits associated with systemic FEC may result in symbols being distributed over time, or different symbols being used, reducing peak values.

In other implementations, the final remapped bit set 520 may be provided to the QAM module 422. As described earlier, the QAM module 422 uses a high bit width during operation. For example, the Fourier transform used by the QAM module 422 may have a bit width of 12 bits. The QAM module 422 provides as output the reduced PAPR data 132. In some implementations, the reduced PAPR data 132 may be processed further by one or more of the peak cancellation module 450, the circular clipping module 452, and so forth.

In some implementations, the transmit remapping module 420 may be omitted. The remapped bit set 520 generated by a test remapping module 410 that is associated with the lowest PAPR value 414 may be stored and provided as input to the QAM module 422.

Figure 6:
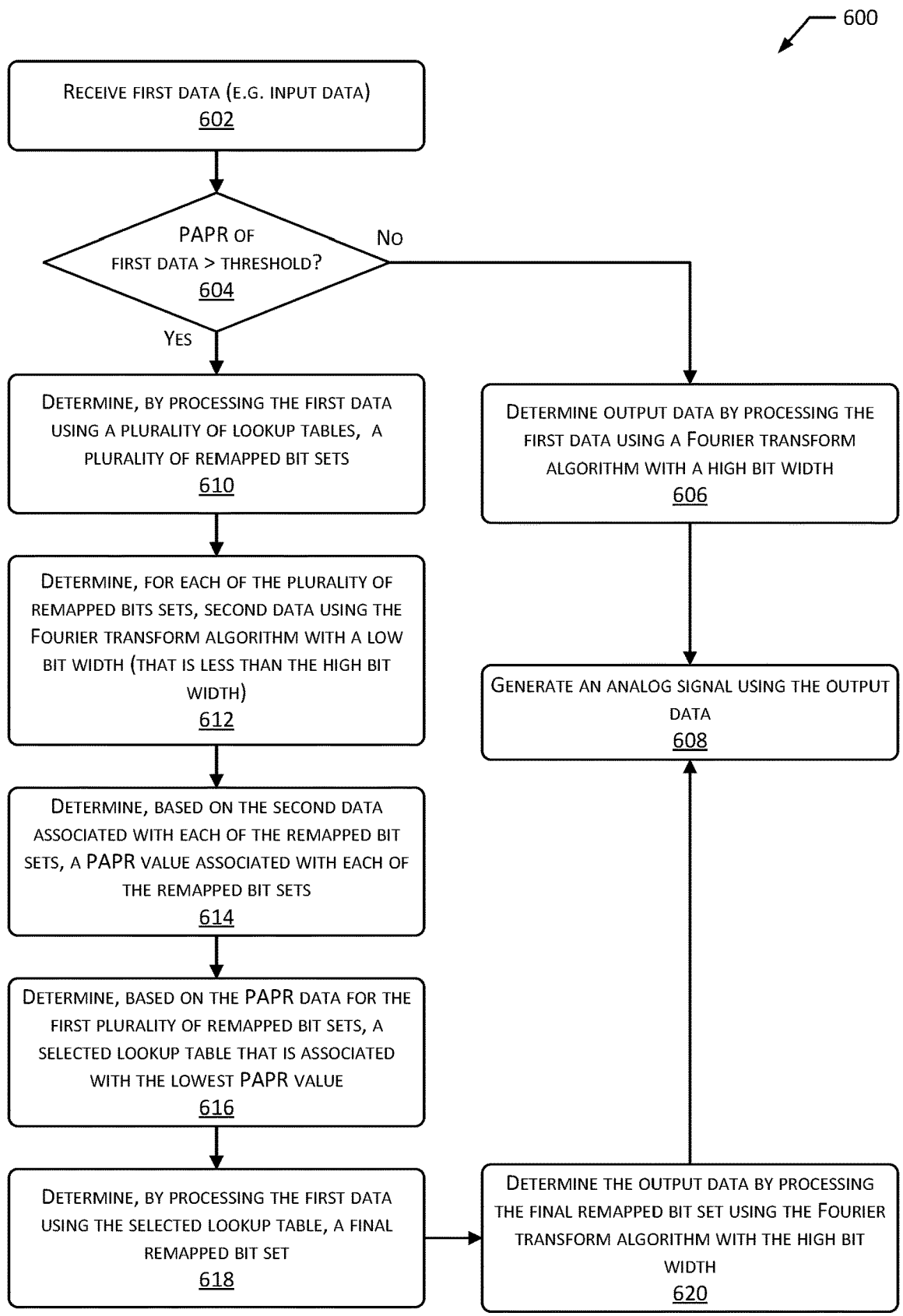
FIG. 6 is a flow diagram of a process of bit remapping to provide a distortionless reduction in PAPR, according to some implementations.

FIG. 6 is a flow diagram 600 of a process of bit remapping to provide a distortionless reduction in PAPR, according to some implementations. The process may be implemented at least in part by the distortionless PAPR reduction module 404, as described with regard to FIGS. 4-5B.

At 602 first data, such as input data 402, is determined for transmission. For example, a ground station 106 may have data to send to the user device 110 via the satellite 102.

At 604 a PAPR value 414 of the first data is determined and compared to a first threshold. If the PAPR of the first data is less than or equal to the first threshold, the process proceeds to 606. For example, the first threshold may comprise a maximum PAPR that is permitted for operation of the power amplifier 138.

At 606 output data is determined by processing the first data using the QAM module 422. The QAM module 422 may use a Fourier transform algorithm with a high bit width to generate output data. The Fourier transform during transform has the effect of converting the data that represents the signals in the time domain into signals in the frequency domain. These resulting signals in the frequency domain are orthogonal to one another. For example, as described in FIG. 5B, the QAM module 422 using a discrete fast Fourier transform with a high bit width of 12 bits may be used to process the first data and generate the output data.

At 608 the output data is used to generate an analog signal. For example, the output data is processed by the DAC 134 to generate the analog OFDM signal 136. The analog OFDM signal 136 may be provided as input to the power amplifier 138 for transmission.

Returning to 604, if the PAPR of the first data is greater than the first threshold, the process may proceed to 610.

At 610 a first set of remapped bit sets 520 of the first data is determined using a plurality of LUTs 412. For example, sixteen test remapping modules 410(1)-410(16), each using respective LUTs 412(1)-412(16), generate sixteen different remapped bit sets 520(1)-520(16).

At 612, second data is determined for each of the remapped bit sets 520. As described with regard to FIG. 5A, each test remapping module 410 may process a respective remapped bit set 520 with a test QAM module 540 to produce test output 542 using a low bit width. For example, the low bit width used for testing may be 5 bits while the high bit width used to generate data for transmission is 12 bits. By generating the test output 542 using the low bit width, a substantial reduction in computational cost and complexity is achieved, compared to the high bit width processing.

In another implementation, the testing modules 406 may operate at the high bit width, and the resulting test output 542 associated with the lowest PAPR may be selected for use as the reduced PAPR data 132. In this implementation, the output module 408 may be omitted, and the test output 542 associated with the lowest PAPR may be used for transmission.

At 614, a PAPR value 414 for each of the plurality of remapped bit sets 520 is determined based on the second data. For example, the test output 542 may be processed by the PAPR determination module 544 to determine the PAPR value 414.

In some implementations, instead of testing all available LUTs 412, the process may operate to find an acceptable PAPR value 414 and proceed. In this implementation, a test remapping module 410 may determine a PAPR value 414, and if that PAPR value 414 is less than a threshold value, the process may proceed to 616. For example, this implementation may be used where the number of test remapping modules 410 are limited, are operated in series, and so forth.

At 616, based on the PAPR value 414, selected LUT data 418 indicative of the LUT 412 that is associated with the lowest PAPR may be determined. For example, the comparison module 416 compares the PAPR value 414(1)-(N) and selects the lowest PAPR value, and corresponding LUT 412, as the selected LUT data 418.

At 618 a final remapped bit set 520 is determined by processing the first data using the LUT 412 indicated by the selected LUT data 418. In some implementations, the remapped bit set 520 that was previously determined by the test remapping module 410 that was associated with the selected LUT 418 may be used.

At 620 the final remapped bit set 520 is processed to determine output data. For example, the QAM module 422 may process the final remapped bit set 520 using a high bit width to determine the output data. The process may then proceed to 608, where the output data is used to generate the analog OFDM signal 136.

Figure 7:
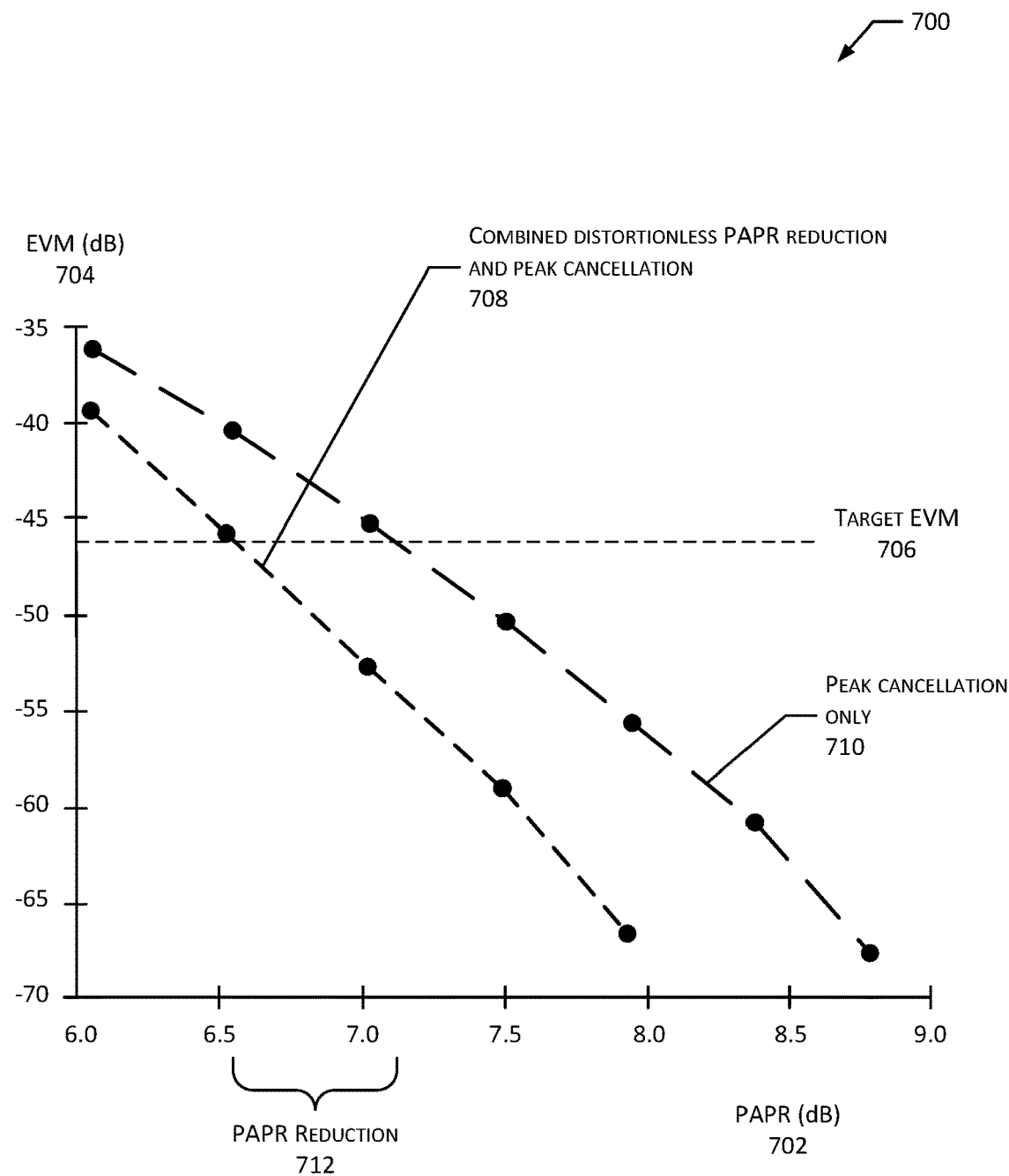
FIG. 7 is a graph illustrating the error vector magnitudes and PAPR of signals processed using peak cancellation as compared to distortionless PAPR reduction, according to some implementations.

FIG. 7 is a graph 700 illustrating the error vector magnitudes (EVM) and PAPR of signals processed using combined distortionless PAPR reduction and peak cancellation, as compared to peak cancellation only, according to some implementations.

In this graph 700, the horizontal axis indicates the PAPR (dB) 702 while the vertical axis indicates EVM (dB) 704. A target EVM 706 is indicted. The target EVM 706 may be determined based on the desired performance of the communication system 120 to transfer data.

The graph depicts, for the same set of input data 402 for transmission, the EVM 704 of analog OFDM signals 136 produced using a combination of distortionless PAPR reduction and peak cancellation 708 as compared to peak cancellation only 710. The peak cancellation only 710 does not achieve the target EVM 706 until a PAPR 702 of approximately 7.1 dB is reached. In comparison, the distortionless PAPR reduction 708 combined with peak cancellation 708 achieves the target EVM 706 at a PAPR 702 of approximately 6.6 dB. By using the distortionless PAPR reduction 708 described in this disclosure, a PAPR reduction 712 of at least 0.5 dB is realized.

By reducing the PAPR 702, the communication system 120 is able to be more compact, use less electrical power, and still provide desired communication throughput without introducing undesirable in-band distortion or out-of-band interference. For example, the reduction in PAPR results in the power amplifier 138 needing less "headroom" to avoid saturation during operation. This directly results in a power amplifier 138 that is physically more compact, has less mass, uses less electrical power, and so forth. As a result, the PAPR reduction provides substantial improvements in a variety of situations including satellites 102, ground stations 106, UTs 108, and so forth. For example, the resulting reductions in volume, mass, and power afforded by the use of the PAPR reduction systems described in this disclosure allows substantial benefits for use onboard the satellite 102. Reduced volume in the power amplifier 138 allows for a volumetrically smaller satellite 102, or more volume within the satellite 102 for other systems or propellant, improving operational capabilities. A reduction in mass likewise allows for improved propulsion performance or increases the mass budget available for other systems or propellant, improving operational capabilities. Similarly, improvement in power efficiency resulting from operating the power amplifier 138 closer to saturation allows for a reduction in power consumption, reducing the size of batteries, photovoltaic arrays, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining first data comprising a first plurality of bits, wherein the first plurality of bits are associated with a first peak-to-average-power ratio (PAPR);
   determining a first lookup table, the determining the first lookup table comprising:
      determining a modulation order "M" indicative of a number of symbols available for modulation;
      determining M entries of input bits, wherein each entry of input bits has a width of log(2)(M) bits;
      determining M entries of output bits, wherein each entry of output bits has a width of log(2)(M) bits; and
      associating individual ones of the entries of input bits with individual ones of the entries of output bits;
   determining, using the first data and the first lookup table, second data, wherein the second data is associated with a second PAPR that is less than the first PAPR, and the second data comprises an identifier indicative of the first lookup table;
   determining third data by performing a peak cancellation on the second data; and
   generating an analog signal based on the third data.

2. The method of claim 1, wherein:
   the determining the M entries of input bits comprises:
      determining a first entry of input bits; and
      determining a second entry of input bits;
   the determining the M entries of output bits comprises:
      determining a first entry of output bits; and
      determining a second entry of output bits;
   the associating the individual ones of the entries of the input bits with the individual ones of the entries of the output bits comprises:
      associating the first entry of the input bits with the first entry of output bits; and
      associating the second entry of the input bits with the second entry of the output bits; and
   wherein the determining the first lookup table further comprises:
      determining a first power associated with the first entry of the output bits; and
      determining a second power associated with the second entry of the output bits, wherein the second power is greater than the first power.

3. The method of claim 1, wherein:
   the associating the individual ones of the entries of input bits with the individual ones of the entries of output bits is based on a power associated with each of the individual one of the entries of the output bits.

4. The method of claim 1, the determining the second data further comprising:
   processing output from the first lookup table with a forward error correction algorithm.

5. The method of claim 1, the determining the second data further comprising:

determining, using the first data and a second lookup table, fourth data, wherein:
the second lookup table associates the M entries of input bits with second M entries of output bits that are different from the M entries of output bits; and
determining the fourth data is associated with a third PAPR that is greater than the first PAPR.

6. The method of claim 1, further comprising:
determining the second PAPR is greater than a first threshold, wherein the determining the third data is performed responsive to the determining the second PAPR is greater than the first threshold;
determining a third PAPR associated with the third data; and
determining the third PAPR is less than a second threshold, wherein the generating the analog signal is performed responsive to the third PAPR being less than the second threshold.

7. A method comprising:
determining first data, wherein the first data comprises a first sequence of bits;
determining a first lookup table, wherein the first lookup table comprises:
a first entry of input bits; and
a first entry of output bits that is associated with the first entry of input bits;
determining, using the first data and the first lookup table, second data;
determining a first peak-to-average-power ratio (PAPR) associated with the second data;
determining a second lookup table;
determining, using the first data and the second lookup table, third data;
determining a second PAPR associated with the third data;
determining the second PAPR is less than the first PAPR; and
determining fourth data by processing the third data with a first Fourier transform algorithm.

8. The method of claim 7, the determining the first PAPR comprising:
processing the second data with the first Fourier transform algorithm to determine first output;
calculating the first PAPR using the first output; and
the determining the second PAPR comprising:
processing the third data with the first Fourier transform algorithm to determine second output; and
calculating the second PAPR using the second output.

9. The method of claim 7, wherein:
the determining the second data comprising:
determining a match between the first sequence of bits and the first entry of input bits; and
providing the first entry of output bits as the second data.

10. The method of claim 7, further comprising:
determining an amplitude of the fourth data exceeds a first threshold that is associated with operation of a power amplifier;
determining fifth data by performing a peak cancellation on the fourth data; and
generating an analog signal based on the fifth data.

11. The method of claim 7, further comprising:
determining an amplitude of the fourth data exceeds a first threshold that is associated with operation of a power amplifier;
determining fifth data by performing a circular clipping on the fourth data; and
generating an analog signal based on the fifth data.

12. The method of claim 7, further comprising:
determining input data; and
determining the first data by processing the input data using a forward error correction algorithm.

13. A system comprising:
a first memory storing first data;
a processor to:
determine, based on the first data, second data using a first lookup table, wherein the second data has a second peak-to-average-power ratio (PAPR) that is less than a first PAPR of the first data;
determine the second PAPR is greater than a first threshold value; and
determine, based on the second data, third data that is associated with a third PAPR that is less than a second threshold value;
a digital to analog converter (DAC) that accepts the third data as input and generates a first analog signal; and
a power amplifier that accepts as input the first analog signal and generates as output a second analog signal.

14. The system of claim 13, wherein the first lookup table comprises:
M entries of input bits, wherein M is a modulation order indicative of a number of symbols available for modulation and each entry has a width of log(2)(M) bits;
M entries of output bits, wherein each entry has a width of log(2)(M) bits; and
individual ones of the entries of input bits are associated with individual ones of the entries of output bits.

15. The system of claim 13, the processor further to:
determine the first lookup table;
determine, using the first data and the first lookup table, fourth data;
determine a fourth PAPR associated with the fourth data;
determine a second lookup table;
determine, using the first data and the second lookup table, the second data; and
determine the second PAPR is less than the fourth PAPR.

16. The system of claim 15, the processor further to:
determine the fourth PAPR by processing the fourth data with a Fourier transform algorithm to determine first output;
calculate the fourth PAPR using the first output;
determine the second PAPR by processing the second data with the Fourier transform algorithm to determine second output; and
calculate the second PAPR using the second output.

17. The system of claim 13, the processor further to:
determine the first data by processing input data using a forward error correction (FEC) algorithm.

18. The system of claim 13, the processor further to:
determine an amplitude of the second data exceeds a first threshold; and
determine the third data by performing a peak cancellation on the second data.

19. The system of claim 13, the processor further to:
determine an amplitude of the second data exceeds a first threshold; and
determine the third data by performing a circular clipping on the second data.

20. The system of claim 13, wherein a peak amplitude of the first analog signal is less than a threshold value of the power amplifier such that the power amplifier operates between 60% and 95% of saturation.

* * * * *